United States Patent [19]
Hawk et al.

[11] 4,184,741
[45] Jan. 22, 1980

[54] FILAMENT-TO-DEVICE COUPLER

[75] Inventors: Robert M. Hawk, Bath; Robert A. Wey, Horseheads, both of N.Y.

[73] Assignee: Corning Glass Works, Corning, N.Y.

[21] Appl. No.: 881,622

[22] Filed: Feb. 27, 1978

[51] Int. Cl.² ............................................... G01B 5/14
[52] U.S. Cl. .................................................. 350/96.20
[58] Field of Search ............... 350/96.20, 96.21, 96.22

[56] References Cited

U.S. PATENT DOCUMENTS

| | | | |
|---|---|---|---|
| 3,734,594 | 5/1973 | Trambarulo | 350/96.21 |
| 3,989,567 | 11/1976 | Tardy | 350/96.21 |
| 4,046,454 | 9/1977 | Pugh | 350/96.21 |
| 4,056,305 | 11/1977 | McCartney | 350/96.21 |

FOREIGN PATENT DOCUMENTS

| | | | |
|---|---|---|---|
| 2549484 | 5/1976 | Fed. Rep. of Germany | 350/96.21 |
| 2273289 | 12/1975 | France | 350/96.21 |
| 2344853 | 10/1977 | France | 350/96.21 |

OTHER PUBLICATIONS

Product Description Sheet for Conax PG Packing Glands.

*Primary Examiner*—Rolf G. Hille
*Attorney, Agent, or Firm*—William J. Simmons, Jr.; Walter S. Zebrowski

[57] ABSTRACT

A coupler is disclosed for properly positioning the endface of an optical waveguide filament with respect to an optoelectronic device in a repeatable fashion. Three elongated rods of deformable material are disposed in mutually contacting relationship within a bore which terminates at the device. After a filament is inserted into the aperture between the rods so that its endface is disposed adjacent to the device, an elastomeric washer is caused to deform inwardly against the rods, thereby causing them to engage the filament. Since the ends of the rods adjacent to the device are secured in the bore, the filament may be replaced by other filaments, the endfaces of which will be precisely positioned with respect to the optoelectronic device.

11 Claims, 7 Drawing Figures

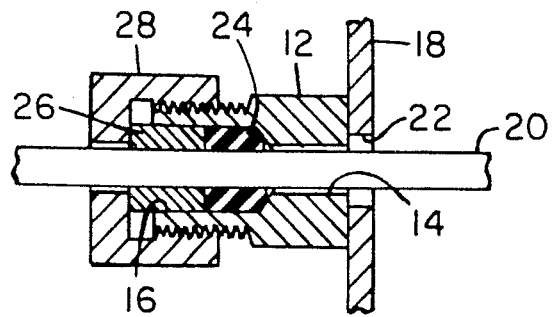
Fig. 1 (PRIOR ART)
Fig. 2
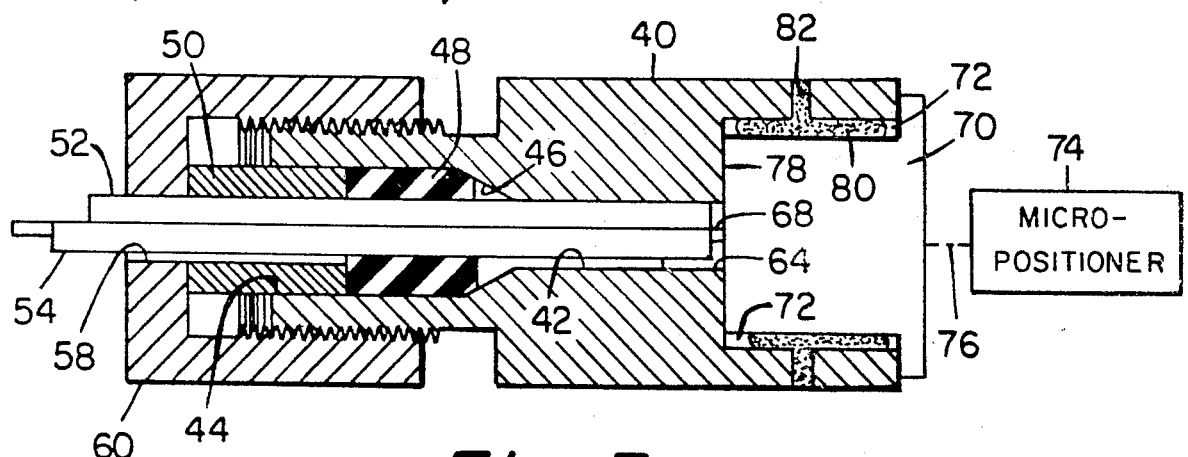
Fig. 3
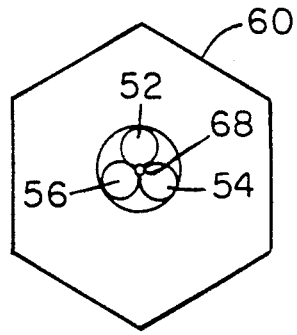
Fig. 4
Fig. 5
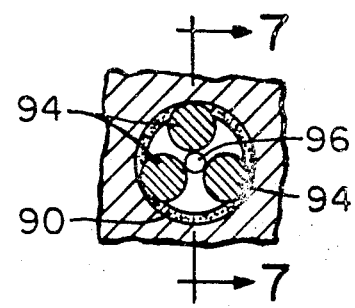
Fig. 6
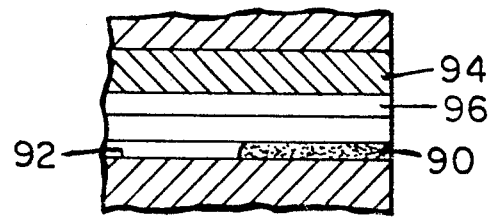
Fig. 7

FILAMENT-TO-DEVICE COUPLER

BACKGROUND OF THE INVENTION

This invention relates to a coupler for precisely positioning the endface of an optical waveguide filament with respect to an optoelectronic device.

Optical waveguide filaments are a promising transmission medium recently developed for use in optical communication systems. Such filaments generally consist of a transparent core surrounded by a layer of transparent cladding material having a refractive index lower than that of the core. It has been well known in the art that light can be propagated along a transparent fiber structure having a higher refractive index than its surroundings. The small difference between core and cladding refractive indices in optical waveguides results in an acceptance angle that is smaller than that of conventional optical fibers, the numerical aperture of optical waveguides generally being about 0.2. Moreover, the fact that a single optical waveguide can be utilized to transmit one or more signals necessitates the coupling of at least one discrete light beam to a single waveguide filament. Thus, suitable means must be provided for efficiently coupling an optical source to such optical waveguide filaments.

The light emission from an optical waveguide source must be highly directional in order to efficiently couple to the optical waveguide because of its low acceptance angle. Since only a very bright light source having the described characteristics can yield efficient coupling, lasers and laser diodes are usually considered for this role. It is necessary to precisely position the endface of an optical waveguide filament with respect to such a light source since a narrow beam of light is emitted from a small area thereof. Likewise, efficient, low-noise, high bandwidth detectors may have small active or sensitive areas.

SUMMARY OF THE INVENTION

It is therefore an object of the present invention to provide a device for reproducibly positioning the endface of an optical waveguide filament with respect to an optoelectronic device.

Briefly, the present invention relates to a device for accurately repositioning the endface of an optical waveguide filament with respect to an optoelectronic device. The coupler comprises a housing having a bore therein, one end of the bore terminating at a surface. Three rods are provided, the ends of which are so disposed in the bore that their axes are equally spaced, the aperture formed between the rods being adapted to receive an optical waveguide filament. Means are provided for securing the end portions of the rods in that end of the bore adjacent the surface. Means are provided for forcing the rods inwardly toward the aperture to secure a filament disposed within that aperture.

BRIEF DESCRIPTION OF THE DRAWINGS

FIG. 1 shows a prior art rod sealing device.

FIG. 2 illustrates the manner in which an optical waveguide filament could be secured by the device of FIG. 1.

FIG. 3 is a cross-sectional view of a preferred embodiment of the present invention.

FIG. 4 shows an end view of the coupler of FIG. 3.

FIG. 5 shows a preferred construction for rods that are employed in the embodiment of FIGS. 3 and 4.

FIGS. 6 and 7 show cross-sectional views of another embodiment of the present invention.

DESCRIPTION OF THE PREFERRED EMBODIMENTS

The utilization of optical waveguide filaments in optical communications systems requires the efficient coupling of such filaments to optoelectronic devices such as light emitters and detectors, the active areas of which may be extremely small. When a signal filament is employed for a single signal channel, the accurate placement of the filament endface with respect to the active area of the device is necessary to obtain efficient coupling of light. Each incremental departure of the filament axis from its optimal location increases the insertion loss at the filament-device junction. The present invention relates to a filament-device coupler which is secured to an optoelectronic device, said coupler being so constructed that an optical waveguide filament inserted therein is always precisely positioned with respect to the active area of the device to insure low loss coupling.

The coupler of the present invention incorporates a device known as a packing gland which is generally employed to pressure or vacuum seal rod-shaped members such as thermocouple probes, capillary tubes and the like. As shown in FIG. 1, such a packing gland comprises a housing 12 having a first bore 14 therein which is coaxial with a second larger bore 16. Housing 12 is secured to wall 18 by any well known means. Surrounding rod-shaped member 20, which passes through bore 14 and through opening 22 in wall 18, are an elastomeric gland washer 24 and a metallic ferrule 26. When outer nut 28 is tightened, ferrule 26 is caused to bear against washer 24 which is compressed longitudinally. Washer 24 is thereby caused to exert an inwardly directed force against member 20, thereby sealing that member within bore 16. In this type of device, washer 24 merely seals member 20, the location of that end of member 20 protruding through opening 22 being determined by bore 14, the size of which should be just large enough to accommodate member 20.

Although the device of FIG. 1 is suitable for the sealing of rod-shaped members of relatively large diameter, problems arise in the application of such a device to position the endface of an optical waveguuide filament. Such a device would have to be made extremely high tolerances. Since the diameters of optical waveguide filaments are generally less than 150 μm, the tolerance of bore 14 should be less than about 5 μm. Moreover, it is difficult to form the gland washer 24 with such small diameter bores. Furthermore, as illustrated in FIG. 2, inhomogeneities of the material of washer 24' can cause an optical waveguide filament 30 to emerge from the end of washer 24' at an angle with respect to the longitudinal axis of the device. If a filament tends to protrude from washer 24' in the manner shown in FIG. 2 but is restrained by bore 14, undue stresses are established within the filament that can cause insertion loss.

A preferred embodiment of the present invention, which is illustrated in FIGS. 3 and 4, avoids the aforementioned disadvantages of the prior art. Disposed within housing 40 are longitudinally aligned bores 42 and 44 which are connected by a beveled region 46. Elastomeric gland washer 48 and ferrule 50 are disposed within bore 44. Three mutually contacting rods 52, 54 and 56 extend through bore 42, washer 48 and ferrule 50. The ends of these rods protrude through opening 58 in the end of outer nut 60. Rods 52, 54 and 56 may consist entirely of elastomeric material but preferably consist of an inner rod 64 of rigid material surrounded by a layer 66 of elastomeric material as shown in FIG. 5. The end of bore 42 is tapered inwardly so that the resilient rods are slightly compressed when inserted therein. This compression of the rods is sufficient to retain the rods in position but is not so severe as to cause the rods to compress against one another and unduly restrict the aperture formed therebetween.

During construction of the coupler, an optical waveguide filament 68 is inserted into the aperture between rods 52, 54 and 56. A light emitting diode 70 is inserted into cavity 72 of housing 40 until its transparent cover abuts against surface 78 of cavity 72. A micropositioner 74 is temporarily connected to diode 70 as illustrated by dashed line 76. Diode 70 is moved relative to alignment filament 68 until the endface thereof is positioned adjacent to the center of the light emitting area of diode 70 as indicated by a maximum output from filament 68. At this time adhesive 80 is injected into one or more bores 82 to permanently retain diode 70 in this position of maximum coupling with respect to the filament. After adhesive 80 has cured, micropositioner 74 and filament 68 are removed. Other means such as mechanical clamping could be employed to secure diode 70.

An advantage of the present coupler resides in the simplicity of its construction. Bore 42 and the apertures in washer 48 and ferrule 50 are much larger than an optical waveguide filament. It is simpler to form such apertures of a diameter large enough to receive rods 52, 54 and 56 rather than that size required to receive filament 68. Moreover, the diameter of rods 52, 54 and 56 are over six times the diameter of the filament that can just fit within the aperture between the rods, so that the tolerance with which the rods are formed need be only about six times the tolerance of a bore the size of the optical waveguide filament.

To connect an optical waveguide filament to the coupling device of the present invention any jacket, coating or the like is first removed from the filament. The filament is then inserted into the aperture between rods 52, 54 and 56 and moved toward diode 70 until its endface is disposed adjacent the device. Nut 60 is then tightened to force ferrule 50 against washer 48. Since washer 48 is forced into beveled region 46, the resultant radially inwardly directed force of washer 48 causes at least the portions of rods 52, 54 and 56 in the vicinity of washer 48 to deform against the filament, thereby securing it in the coupler. Since the ends of rods 52, 54 and 56 are fixedly mounted within the tapered portion of bore 42, any filament which is inserted into the coupler will have its endface properly positioned with respect to the light emitting portion of diode 70. That is to say, after diode 70 has been properly positioned with respect to the alignment filament 68, any other filament of about the same diameter will also be aligned by the connector with its endface at substantially the same position as that of the alignment filament.

In FIG. 3 rods 54 and 56 protrude beyond rod 52 to facilitate the insertion of a filament into the aperture between the rods. The end of the filament is merely inserted into the groove formed by rods 54 and 56 and then slid into the aperture. Alternatively, the ends of the rods may be tapered to form an enlarged aperture into which the filament may be easily inserted.

The ends of the rods can be secured in the end of bore 42 by means other than a friction fit in tapered region 64. For example, a thin layer of bonding material can be applied to the walls of the bore prior to insertion of the rods. After the rods have been inserted into the bore, the bonding material is permitted to dry prior to insertion of alignment filament 68. The entire bore 42 could be tapered to facilitate the insertion of the rods therein. In the embodiment illustrated in FIG. 3 only that end of bore 42 adjacent to cavity 72 need be of a diameter that is just sufficient to receive the rods.

In the embodiment illustrated in FIGS. 6 and 7 a layer 90 of adhesive material is first disposed in the end of bore 92. Rods 94 are then inserted into the bore and alignment filament 96 is inserted therebetween. The rods are made of rigid material so that the diameter of filament 96 must be slightly greater than that of the filaments which are intended to be used with the device. The rods can be properly positioned around filament 96 by initially having them protrude beyond the end of bore 92 where they are engaged by a mounting jig. After bonding material 90 has become set the jig is removed and the ends of rods 94 can be ground flush with respect to the surface forming the end of cavity 72. After bonding material 90 has become set, it must be resilient enough to permit movement of the nonbonded ends of the rods.

The connector embodiment of FIG. 6 is aligned and utilized in the same manner as that which was described in conjunction with FIG. 3. A laser diode or other optoelectronic device is first aligned and then fixedly mounted with respect to alignment filament 96 which is then removed. To optically connect an optical waveguide filament with the optoelectronic device, the coating is first removed from the end portion thereof, and the filament is inserted between rods 94 until it is in position with its endface adjacent to the optoelectronic device. As nut 60 is tightened, washer 48 causes the rods to move inwardly and retain the filament in the connector.

It is noted that the end portion of the optical waveguide filament adjacent to the optoelectronic device is loosely held in the aperture between the rods. By employing relatively large diameter rods to form the aperture in which the filament end portion is situated, a high tolerance aperture is more easily formed.

We claim:

1. A coupler for accurately positioning the endface of an optical waveguide filament with respect to the active area of an optoelectronic device, said coupler comprising a housing having a bore therein, one end of said bore terminating at a surface, three rods, the ends of which are so disposed in said bore that an aperture is formed therebetween that is adapted to receive an optical waveguide filament, means for securing only the end portions of said rods in that end of said bore adjacent said surface, means separate from said means for securing for forcing said rods inwardly toward said aperture for securing any filament disposed therein, said means for forcing being located at a region along the length of said rods that is remote from said end portions, and means for supporting an optoelectronic device adjacent said surface so that a filament can be inserted into that portion of said aperture opposite said end portions and moved toward said end portions until it is adjacent to said device.

2. A coupler in accordance with claim 1 wherein at least the surface portion of said rods consists of resilient material and wherein at least that end of said bore adjacent said surface is tapered inwardly toward said surface, the ends of said rods being secured in said tapered section by a friction fit.

3. A coupler in accordance with claim 2 wherein said rods comprise a core of rigid material surrounded by a layer of elastomeric material.

4. A coupler in accordance with claim 1 wherein said rods are formed of rigid material and wherein said means for securing the ends of said rods in said bore comprises a layer of resilient bonding material for attaching at least the end portions of said rods to the surface of said bore.

5. A coupler in accordance with claim 1 wherein said means for compressing said rods inwardly comprises a washer of resilient material surrounding said rods, means for compressing said washer in a direction parallel to the axes of said rods and means for restraining said washer from expanding in a direction away from said rods whereby said washer expands inwardly against said rods.

6. A coupler for accurately positioning the endface of an optical waveguide filament with respect to the active area of an optoelectronic device, said coupler comprising
 a housing having a first bore therein which terminates at a surface,
 a second bore in said housing longitudinally aligned with respect to said first bore, said second bore having a diameter larger than that of said first bore and being disposed at that end of said first bore opposite said surface,
 a washer of resilient material disposed in said second bore,
 a tubular ferrule disposed adjacent to said washer on that side thereof opposite said first bore,
 three rods disposed within said ferrule, said washer and said first bore, said rods being disposed adjacent one another to form a central aperture therebetween for receiving said optical waveguide filament,
 means for securing only the end portions of said rods in that end of said first bore adjacent said surface,
 means forcing said ferrule to move toward said washer to compress said washer in a direction parallel to the axes of said rods so that said washer exerts an inwardly directed force against said rods, and
 means for securing said optoelectronic device adjacent said surface with the active area of said device aligned with said aperture, whereby a filament can be inserted into that portion of said aperture opposite said end portions and moved toward said end portions until it is adjacent to said device.

7. A coupler in accordance with claim 6 further comprising a cavity in said housing, said surface forming a wall of said cavity, said device being disposed within said cavity, and means for securing said device against movement in said cavity.

8. A coupler in accordance with claim 7 wherein said means for securing said device comprises at least one layer of bonding material disposed between said device and an adjacent wall of said cavity.

9. A coupler in accordance with claim 8 wherein at least the surface portion of said rods consists of resilient material and wherein at least that end of said bore adjacent said surface is tapered inwardly toward said surface, the ends of said rods being secured in said tapered section by a friction fit.

10. A coupler in accordance with claim 9 wherein said rods comprise a core of rigid material surrounded by a layer of resilient material.

11. A coupler in accordance with claim 8 wherein said rods are formed of rigid material and wherein said means for securing the ends of said rods in said bore comprises a layer of resilient bonding material for attaching at least the end portions of said rods to the surface of said bore.

* * * * *